United States Patent

[11] 3,549,012

| [72] | Inventors | Vladimir Mackrle<br>Svatopluk Mackrle and Oldrich Dracka,<br>Brno, Czechoslovakia |
|---|---|---|
| [21] | Appl. No. | 695,420 |
| [22] | Filed | Jan. 3, 1968 |
| [45] | Patented | Dec. 22, 1970 |
| [73] | Assignee | Ceskoslovenska Akademie ved<br>Prague, Czechoslovakia |
| [32] | Priority | Jan. 7, 1967, Dec. 5, 1967 |
| [33] | | Czechoslovakia |
| [31] | | Nos. PV158-67 and PV8620-67 |

[54] METHOD AND EQUIPMENT FOR AUTOMATIC WASHING OF RAPID FILTERS
4 Claims, 1 Drawing Fig.

[52] U.S. Cl. .................................................. 210/108,
210/138, 210/261
[51] Int. Cl. .................................................... B01d 23/24
[50] Field of Search........................................... 210/80, 82,
108, 73, 138—140, 411, 259, 260, 261

[56] References Cited
UNITED STATES PATENTS
553,641 1/1896 Deutsch ........................ 210/80

| 2,053,628 | 9/1936 | Paterson.................... | 210/80 |
| 2,879,891 | 3/1959 | Beohner et al............... | 210/80 |
| 3,260,366 | 7/1966 | Buff et al. ................... | 210/140X |
| 3,224,964 | 12/1965 | Derenk et al. ............... | 210/259X |
| 3,306,447 | 2/1967 | Medeiros..................... | 210/260X |

*Primary Examiner*—John Adee
*Attorney*—Michael S. Striker

ABSTRACT: Solids-containing liquid is subjected to sludge blanket clarification. The clarified liquid, from which some of the solids have been removed while others remain, is passed from one side through a filter body to issue at the other side of the same as filtered liquid. The solids which are retained by the filter body clog the interstices thereof so that the flow resistance of the filter body increases. This causes backup of the infiltered clarified liquid at the one side and when the level of this unfiltered liquid rises to a predetermined extent, further filtration is terminated and movement of the unfiltered clarified liquid through the filter body in opposite direction is initiated in automatic response to the level rising to this extent, whereby to flush the accumulated solids out of the interstices of the filter body.

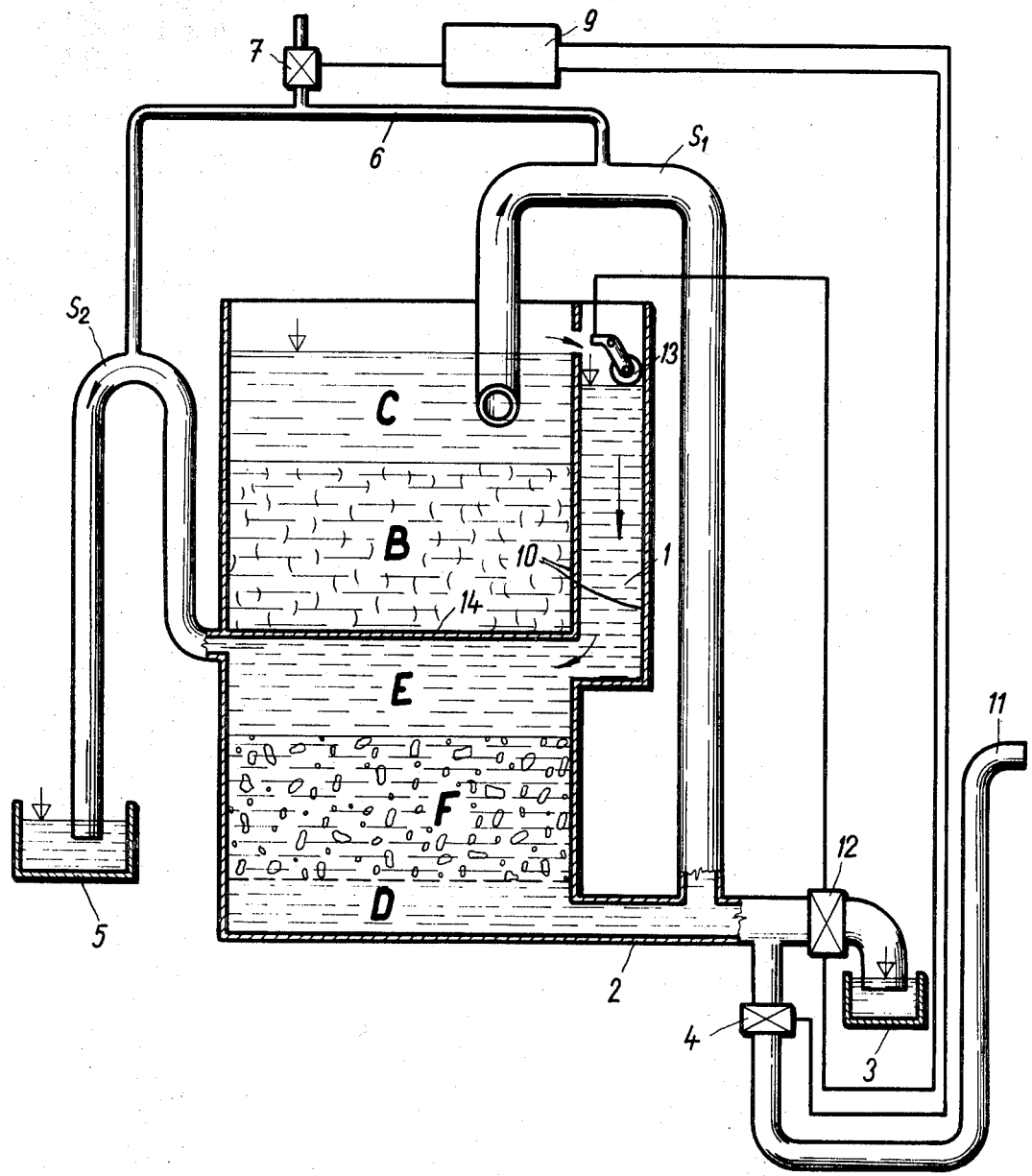

METHOD AND EQUIPMENT FOR AUTOMATIC WASHING OF RAPID FILTERS

In the chemical purification of liquids, filters are usually used for the final treatment, where the liquid together with the suspension is purified by filtration through a granular filter bed. The filter bed must be regenerated after a certain time by washing whereby the retained suspension is removed. This is done by backwash of the filtered liquid which is brought to expansion by the filter bed, the detained suspension thus being washed out of the filter bed. For perfect washing it is necessary to convey within a short time a relatively large volume of liquid under a sufficiently high pressure so that the necessary expansion of the filter bed can take place. The rate of washing is a multiple of the rate of filtration. The known systems use either high-capacity pumps, pumping the filtered liquid from the storage tank and imparting to it a sufficiently high pressure, or else the storage tank in which the filtered liquid is collected is placed sufficiently high over the filter.

The disadvantage of the first method resides in higher investment costs for large washing pumps, distribution systems, and large-size valves, rendering automation difficult and requiring much maintenance.

On the other hand, the use of a filtered water storage tank placed sufficiently high over the rapid filter permits gravity washing of the filter. Technical design solutions are known, where the filtered water storage tank for gravity washing of the rapid filter is placed over the latter in a single tank, and where the liquid after filtration flows into the storage tank over the filter. This arrangement permits automatic gravity washing of the rapid filter, but has numerous disadvantages responsible for this filter-washing system not having gained firm acceptance. The greatest disadvantage of the gravity-washing system for rapid filters is due to the increased dimensions of the rapid filter brought about by the storage tank. Because the filtered liquid must rise after passing through the filter bed into the storage tank over the filter, only a low pressure is attainable in the filter zone during filtration. This, in turn, results in a low filtration velocity and a short filtration time making little use of the sludge capacity of the filter bed. Another weak point of this rapid filter-washing system is the impossibility of using the entire contents of the filtered water storage tank for washing, because in the bottom section of the tank there is already an insufficient pressure for producing the expansion of the filter bed during washing, and this in turn, leads to increasing the height dimensions of the entire equipment.

These disadvantages are removed by the method of automatic washing of rapid filters and the equipment, described in the present specification describing the invention.

The nature of the method of automatic washing of rapid filters in accordance with the invention consists in that the supply of clarified water from the clarifier for rapid filter washing is started by the creation of a vacuum in the inlet siphon due to the action of the outlet siphon, initiated by the increased resistance of the filter when the latter is clogged. In two-stage suspension separation, where sludge blanket filtration is used as the first stage and filtration in the rapid filter as the second stage, the pressure needed for washing is obtained through accommodating the sludge blanket above the rapid filter, the liquid for washing the rapid filter being taken from the zone of clarified liquid above the sludge blanket. The possibility of using the clarified liquid for washing is given in that equipment operating in the sludge blanket principle can have such a separating efficiency that the clarified liquid for washing the filters is of sufficiently good quality. The zone of clarified liquid, at the same time, forms a sufficient volume of liquid which is steadily topped up to the operation of the sludge blanket during washing. Sludge blanket clarifiers are more fully described in U.S. Pat. No. 3,307,702 (S. Mackrle et al.) to which reference may be had for background information.

A method of automatic washing of rapid filters substantially as described herein with reference to and as shown in the accompanying drawing, consisting in that the washing circuit for the rapid filter, located in a common tank below the sludge blanket, is based, in essence, on the use of two siphons, i.e. an inlet siphon in the intake section and an outlet siphon in the outlet section, which are interconnected on the one hand by means of the rapid filter and, on the other hand, by means of a pipe provided with an air inlet valve which is controlled by a time switch, the inlet siphon connecting the zone of clarified liquid above the sludge blanket with the filter underdrain and the outlet siphon connecting the expansion zone above the filter bed with the drain channel. The filtered water discharge conduit is provided with a slide valve which, for the purpose of interrupting filtration and starting washing is connected to a water level indicator on the filter, and for the purpose of starting filtration to a time switch. The equipment disclosed herein forms an automatic system for gravity washing of a rapid filter.

An exemplary embodiment of such equipment for clarifying and filtering water with automatic washing of a rapid filter is described hereafter and schematically illustrated in the attached drawing in cross-sectional view.

In the common tank 10 there is located a rapid filter with filter bed F and expansion zone E; above the rapid filter, separated from it by partition wall 14, is the clarifier with sludge blanket B and clarified water zone C. The upper part of clarified water zone C is connected by the space 1 with an expansion zone E. Below filter bed F there is provided a filter underdrain D, from where the filtered water is drained by discharge conduit 2. Into the discharge conduit 2 empties an inlet siphon S1, which communicates with the clarified water zone C. Discharge conduit 2 empties into channel 3 for draining the filtered water. To discharge conduit 2 is attached drain pipe 11 with valve 4 for discharging the filtered water into the drain during the starting period of filtration. Discharge conduit 2 is provided with valve 12, closing of which during starting of washing is controlled by water level indicator 13 on the filter; opening of valve 12 during finishing of washing is controlled by a time switch 9. Out of expansion zone E runs outlet siphon S2, emptying into drain channel 5 with water seal. The top parts of siphons S1 and S2 are connected by pipe 6 to which is fitted an air inlet valve 7. Air inlet valve 7 and valve 4 are also connected with time switch 9.

The equipment described herein works as follows:

During clarification of the water flows from sludge blanket B of the clarifier into clarified water zone C, from where it flows over into space 1 through which it is conveyed to expansion zone E. From expansion E it is filtered through filter bed F into filter underdrain D, from where it is conveyed through discharge conduit 2 into channel 3 for draining the filtered water. Siphons S1 and S2 are not in operation during this process, air inlet valve 7 and valve 4 are closed, while valve 12 is open. During filtration, due to clogging of filter bed F by the suspension, the pressure loss in the bed is increased, the water level in shaft 1 and in outlet siphon S2 rises, and when the level reaches the preset height, water level indicator 13 on the filter closes valve 12 and actuates time switch 9. Immediately thereafter outlet siphon S2 is flooded by the flow of clarified water. The negative pressure in outlet siphon S2 draws air through pipe 6 from inlet siphon S1 which thus is flooded and put into operation.

By this mechanism, washing of the rapid filter is started automatically, as soon as the pressure loss in the rapid filter reaches the preset value. During washing the clarified water flows from clarified water zone C through inlet siphon S1 and discharge conduit 2 into filter underdrain D and through filter bed F, which is in expansion, and outlet siphon S2 into drain channel 5.

After a certain time, corresponding to perfect washing of filter bed F, air inlet valve 7 is opened by time switch 9, air thus penetrating into siphons S1 and S2 and interrupting the latter's operation; at the same time, the time switch 9 opens valve 4. Thus washing is interrupted and the water begins to flow from clarified water zone C through space 1 via expansion zone E and filter bed F into filter underdrain D from where it is conveyed through discharge conduit 2 via open valve 4 into drain pipe 11. After a certain time required for starting up filtration, valve 4 and air inlet valve 7 are closed by the time switch. Through opening of valve 12 by the time switch, filtration is resumed again.

The method and the equipment for automatic washing of rapid filters substantially as herein described with reference to and as shown in the accompanying drawing have numerous advantages. The use of clarified water from the clarified water zone of the clarifier, located over the rapid filter, does away with the necessity of using a filtered water storage tank and permits gravity washing of the rapid filter. The washing circuit formed of two siphons for inlet and outlet of the washing liquid from the clarified liquid zone of the clarifier makes it possible to utilize the total hydrostatic head of the liquid, given by the aggregate head of the clarifier and the rapid filter, for filtration, which enables the use of higher filtration rates and prolongs the filter run at higher utilization of the sludge capacity of the filter bed.

We claim:

1. Apparatus of the character described, comprising in combination, a receptacle defining an upper chamber constituting a sludge blanket clarifier for clarifying of solids-containing liquid and having an intake for such liquid, and a lower chamber communicating with said upper chamber; a filter body disposed in said lower chamber and having an upper side and an underside; conveying means for conveying a flow of solids-containing clarified liquid from said upper chamber into said lower chamber to the upper side of said filter body for passage through the latter in predetermined direction towards and beyond said underside so as to issue from said underside as filtered liquid, whereby the solids accumulate in the interstices of said filter body increasing the flow resistance thereof, and a column of clarified liquid develops above said upper side; conduit means communicating between said upper chamber and said underside of said filter body; control means, including a first syphon tube having an outlet externally of said receptacle and an inlet communicating with said lower chamber at a first level above said filter body but below said intake, a second syphon tube having an inlet communicating with said upper chamber at a second level above said first level and an outlet communicating with both of said tubes so that, when said column rises in said upper chamber to a predetermined level, the clarified liquid of said column overflows through said first syphon tube, thereby establishing suction in the same and through said conduit in said second syphon tube and initiating the flow of a stream of clarified liquid through said second syphon tube and said conduit means to said underside of said filter body for passage through the latter oppositely to said predetermined direction so as to flush accumulated solids from the interstices of said filter body; and timing means operatively associated with said control means for maintaining said stream during a predetermined period of time requisite for at least partially flushing the accumulated solids from said filter body.

2. Apparatus as defined in claim 1; further comprising an outlet conduit communicating with said lower chamber below said filter body for outflow of said filtered liquid, and wherein said control means further comprises valve means arranged in said outlet conduit and being operative for closing the same; and said timing means being operative for closing said valve means in response to initiation of the flow of said stream and for maintaining said valve means closed during said predetermined period of time.

3. Apparatus as defined in claim 2, said control means further comprising normally closed additional valve means provided in said conduit and operable for establishing communication of said conduit with the ambient atmosphere, said timing means being associated with said additional valve means and being operative for opening the same upon expiration of said period of time to thereby terminate said suction and the flow of liquid through said syphon tubes.

4. Apparatus as defined in claim 2, wherein said outlet of said second syphon tube communicates with said outlet conduit upstream of said valve means.